(No Model.)
J. C. HUME & T. A. TATE.
MINER'S CANDLESTICK.
No. 255,995. Patented Apr. 4, 1882.
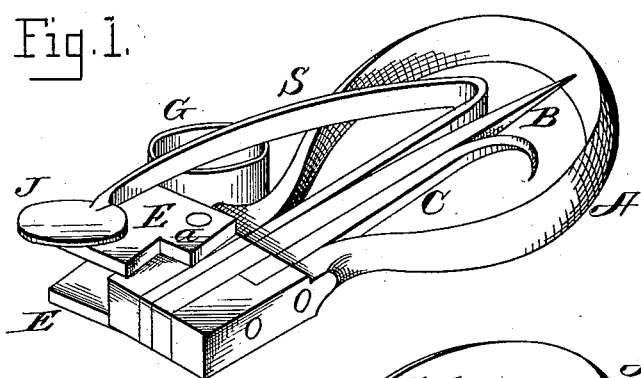
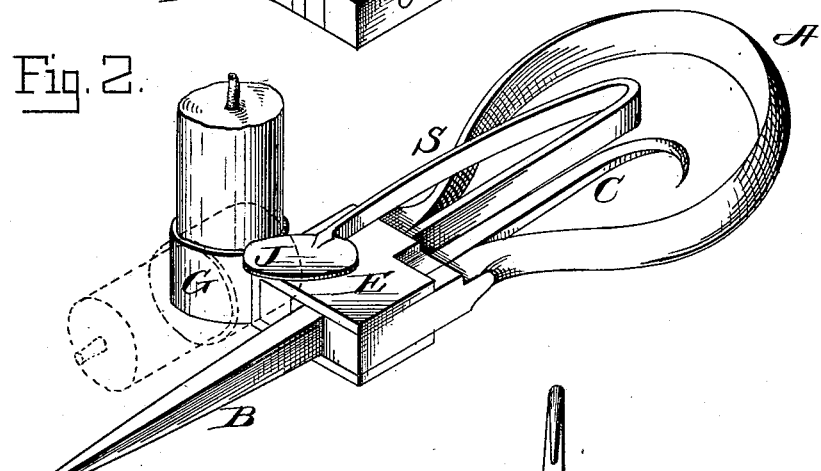
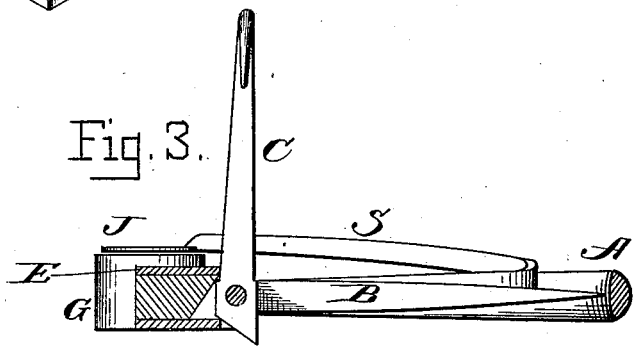
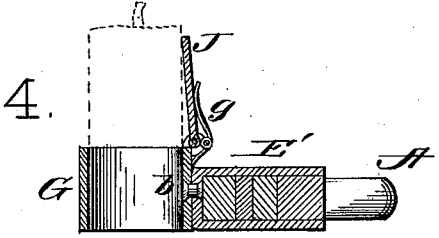
WITNESSES
Franck L. Ourand
J. J. McCarthy
INVENTOR
John C. Hume and
Thomas A. Tate
By C. M. Alexander
Attorney

UNITED STATES PATENT OFFICE.

JOHN C. HUME AND THOMAS A. TATE, OF LEADVILLE, COLORADO.

MINER'S CANDLESTICK.

SPECIFICATION forming part of Letters Patent No. 255,995, dated April 4, 1882.

Application filed February 10, 1882. (No model.)

*To all whom it may concern:*

Be it known that we, JOHN C. HUME and THOMAS A. TATE, of Leadville, in the county of Lake and State of Colorado, have invented certain new and useful Improvements in Miners' Candlesticks; and we do hereby declare that the following is a full, clear, and exact description thereof, reference being had to the accompanying drawings, and to the letters of reference marked thereon, making a part of this specification.

This invention relates to novel improvements on miner's candle-holders; and the nature of our invention consists in the combination of a bow or handle, a pivoted spike, a pivoted hook, a pivoted retaining device, a socket for the candle applied to said retaining device, and a spring-actuated extinguisher, which will operate to hold the candle in its socket, and also to extinguish the light when the candle burns down to the edge of the socket, as will be hereinafter explained.

In the annexed drawings, Figure 1 is a perspective view of the device, showing the hook, the spike, and the socket closed. Fig. 2 shows the device adjusted for use. Fig. 3 is a longitudinal section; and Fig. 4 is a transverse section, showing modifications.

Similar letters of reference indicate corresponding parts.

A designates the handle of the device, which is preferably formed as shown, and provided between its jaws with a spike, B, and a hook, C. The spike and hook are pivoted between the jaws of the handle, so that they can be adjusted for use, as shown in Fig. 2, or folded in the handle, as shown in Fig. 1. The pivoted end of the hook C is recessed into one of the jaws, so that when this hook is adjusted, as shown in Fig. 2, it can be rigidly held by the notched portion of a retaining-clasp, E, which is pivoted at $a$ to one of the jaws of the handle. This clasp E also serves to embrace the said jaws and confine the hook and spike either in a folded position or in an open position. (Shown in the drawings.) The spike will hold the device to a wall or other object, and the hook may be attached to the hat of a miner or to any other convenient object.

The clasp E can be folded back when the device is not in use, so as to render the same compact for carrying it in the pocket.

G designates the socket or ring for receiving the candle. This socket is connected to the pivoted clasp E by a swivel-joint, $b$, which allows the socket to be turned as shown in Fig. 2 in dotted lines, in which position a candle can be conveniently carried in the pocket, inserted in the socket.

J designates an extinguisher for the candle, which is represented in Figs. 1 and 2 as applied on the free end of a U-shaped spring, S, that is rigidly secured between the jaws of the handle A. The spring S causes the plate J to be pressed edgewise against a candle when in the socket, thereby holding the candle in its place, and when the latter burns down to a level with the top of the socket the said plate J will be forced over the top of the socket and extinguish the flame.

Instead of the extinguisher shown in Figs. 1 and 2, we prefer to hinge the plate J to the socket on a level with the top thereof, as shown in Fig. 4, and combine with the plate thus hinged a spring, $g$. The plate J will thus be pressed flatwise against the candle, and when the latter is burned down to a level with the socket said plate will be pressed down on the top of the candle and extinguish the flame.

It will be seen that we can adjust either the hook or the spike into a position for use; or we can adjust both of these parts in such position.

We are aware that it is not new to combine in a miner's candlestick a spike formed rigidly on a handle, in combination with a socket for the candle and a spring-extinguisher, and therefore we do not broadly claim such a combination of devices.

Having described our invention, we claim—

1. The combination, in a miner's candle-holder, of the handle A, the hook and spike, one or both, pivoted between the jaws of said handle, the pivoted clasp E, and the socket applied to this clasp, substantially as described.

2. The combination of the clasp E, pivoted to the handle A, and the socket G, connected by a swivel, b, to the clasp, substantially as described.

3. The combination of the handle A, the spike and hook pivoted between the jaws of the handle, the pivoted clasp, the swivel-socket, and the hinged spring-actuated extinguishing-plate, substantially as described.

In testimony whereof I affix my signature, in presence of two witnesses, this 27th day of January, 1882.

JOHN C. HUME.

Witnesses:
J. J. McCARTHY,
EDWIN L. YEWELL.

In testimony whereof I affix my signature, in presence of two witnesses, this 2d day of February, 1882.

T. A. TATE.

Witnesses:
A. DANFORD,
C. W. LYKE.